(12) United States Patent
Johan et al.

(10) Patent No.: US 10,110,750 B2
(45) Date of Patent: Oct. 23, 2018

(54) CENTRAL STATION CONNECTIVITY

(71) Applicant: UHS Systems Pty Ltd, Rosebery (AU)

(72) Inventors: Ron Johan, Queens Park (AU); James Barlow, Northwood (AU); Gabriel Daher, Long Point (AU); Daniel Ming On Wu, Chatswood (AU)

(73) Assignee: CARRIER CORPORATION, Farmington, CT (US)

( * ) Notice: Subject to any disclaimer, the term of this patent is extended or adjusted under 35 U.S.C. 154(b) by 132 days.

(21) Appl. No.: 14/908,405

(22) PCT Filed: Jul. 21, 2014

(86) PCT No.: PCT/AU2014/050140
§ 371 (c)(1),
(2) Date: Jan. 28, 2016

(87) PCT Pub. No.: WO2015/013756
PCT Pub. Date: Feb. 5, 2015

(65) Prior Publication Data
US 2016/0191714 A1 Jun. 30, 2016

(30) Foreign Application Priority Data
Aug. 1, 2013 (AU) ................. 2013902859

(51) Int. Cl.
*H04L 12/66* (2006.01)
*H04M 7/12* (2006.01)
(Continued)

(52) U.S. Cl.
CPC ........ *H04M 7/122* (2013.01); *H04L 12/4625* (2013.01); *H04M 7/128* (2013.01); *H04M 11/04* (2013.01)

(58) Field of Classification Search
CPC ...................................................... H04M 7/122
(Continued)

(56) References Cited

U.S. PATENT DOCUMENTS 7,779,197 B1  8/2010  Norrie et al.
7,894,437 B2  2/2011  Absillis
(Continued)

FOREIGN PATENT DOCUMENTS

WO   2012093379 A1   7/2012

OTHER PUBLICATIONS

European Search Report for application EP 14831488.3, dated Feb. 7, 2017, 10 pages.
(Continued)

*Primary Examiner* — Christopher R Crompton
(74) *Attorney, Agent, or Firm* — Cantor Colburn LLP

(57) ABSTRACT

Data switching means (6.070, 6.072) for directing messages from a plurality of sources (6.040, 6.042, 6.044, 6,045) and having a common destination (6.108) to a link (6.078) to the common destination, including a first multiplexer (6.070) having a data link (6.074) adapted to receive upstream messages from a plurality of sources, and one or more upstream ports (12.410.1, 12.410.2) each upstream port having a specific port identity, wherein each upstream message includes address information (16.602) identifying the multiplexer and a selected one of the upstream port identities, the transmission means being adapted to link upstream message to the selected upstream port, the selected upstream port being linked to message delivery means (6.072) adapted to address the upstream message to a destination address associated with the message delivery means. Format conversion means can be included to convert the messages from a first format to a second format.

24 Claims, 14 Drawing Sheets

(51) Int. Cl.
*H04L 12/46* (2006.01)
*H04M 11/04* (2006.01)

(58) Field of Classification Search
USPC .......................................................... 370/354
See application file for complete search history.

(56) References Cited

U.S. PATENT DOCUMENTS

| 9,264,552 B2* | 2/2016 | Kahn ................. H04L 65/1073 |
| 2003/0231623 A1 | 12/2003 | Ryu |
| 2008/0014901 A1 | 1/2008 | Motley et al. |

OTHER PUBLICATIONS

International Preliminary Report on Patentability for application PCT/AU2014/050140, dated Jul. 8, 2015, 4 pages.
International Search Report for application PCT/AU2014/050140, dated Nov. 7, 2014, 4 pages.
Written Opinion for application PCT/AU2014/050140, dated Nov. 7, 2014, 4 pages.

* cited by examiner

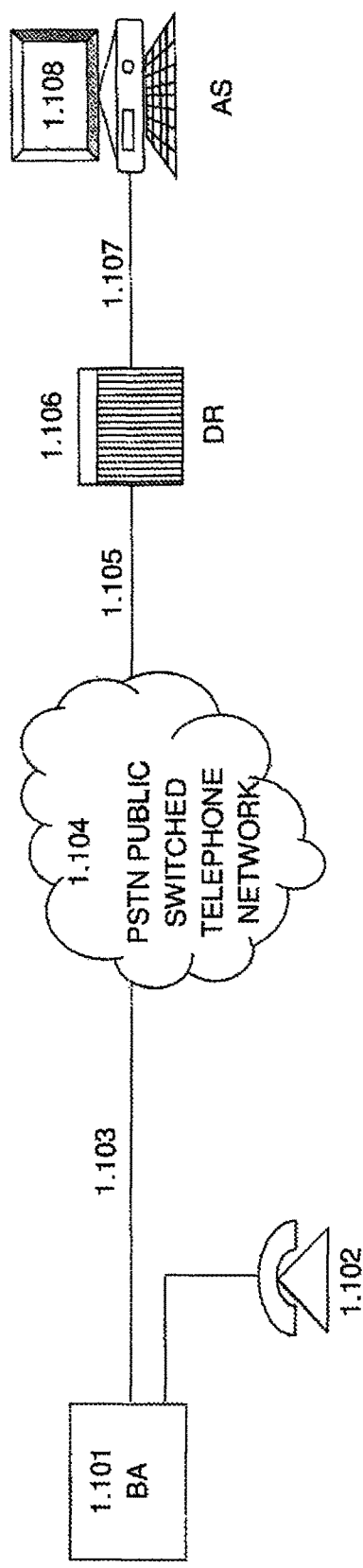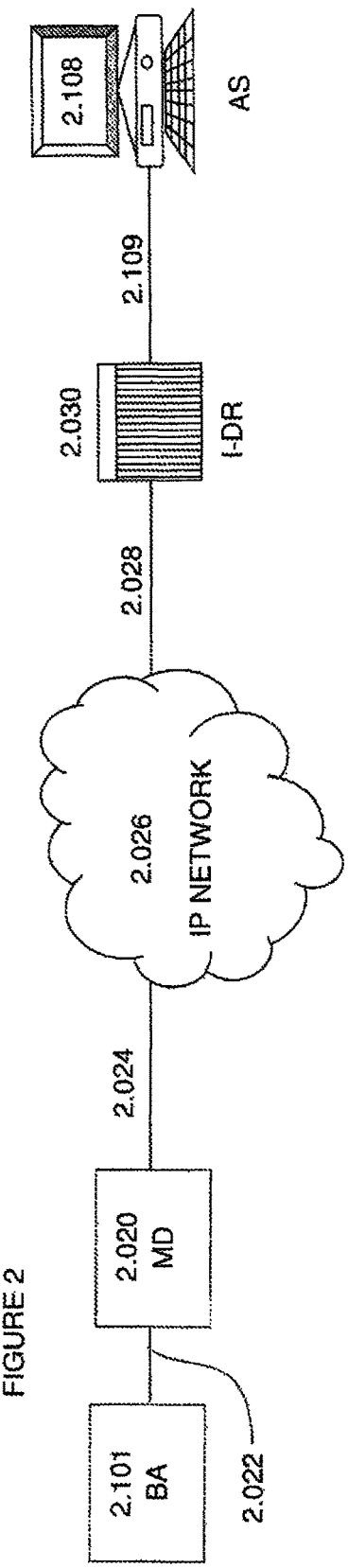

FIGURE 7

| 7.080 TYPE 8 BITS | 7.082 LENGTH 16 BITS | 7.084 CUSTOMER TERMINAL ID 32 BITS | 7.086 TIMESTAMP DHMS 24 BITS | 7.088 INFORMATION <= 100 BYTES | 7.083 SEQUENCE NUMBER 32 BITS | 7.089 CHECK DATA 2 BYTES |

ALARM EVENT NOTIFICATION FROM CUSTOMER TERMINAL TO MANAGEMENT TERMINAL

FIGURE 8

| 8.090 TYPE 8 BITS | 8.092 LENGTH 16 BITS | 8.094 SEQUENCE NUMBER 32 BITS | 8.096 INFORMATION <= 100 BYTES | 8.089 CHECK DATA 2 BYTES |

ACKNOWLEDGEMENT MESSAGE FROM MANAGEMENT TERMINAL TO CUSTOMER TERMINAL

| CUSTOMER TERMINAL ID | ACCESS POINT ADDRESS | PROTOCOL | PRIORITY |
|---|---|---|---|
| 1001 | 900 | 1 | 1 |
| 1001 | 901 | 1 | 2 |
| 1272 | 302 | 3 | 1 |
| 1492 | 101 | 2 | 1 |
| 1492 | 102 | 2 | 2 |
| 1872 | 900 | 1 | 1 |
| 2059 | 857 | 2 | 1 |
| 2846 | 751 | 1 | 1 |
| 3188 | 302 | 3 | 1 |
| 3188 | 303 | 3 | 2 |
| 3188 | 305 | 3 | 3 |
| ••• | ••• | ••• | ••• |

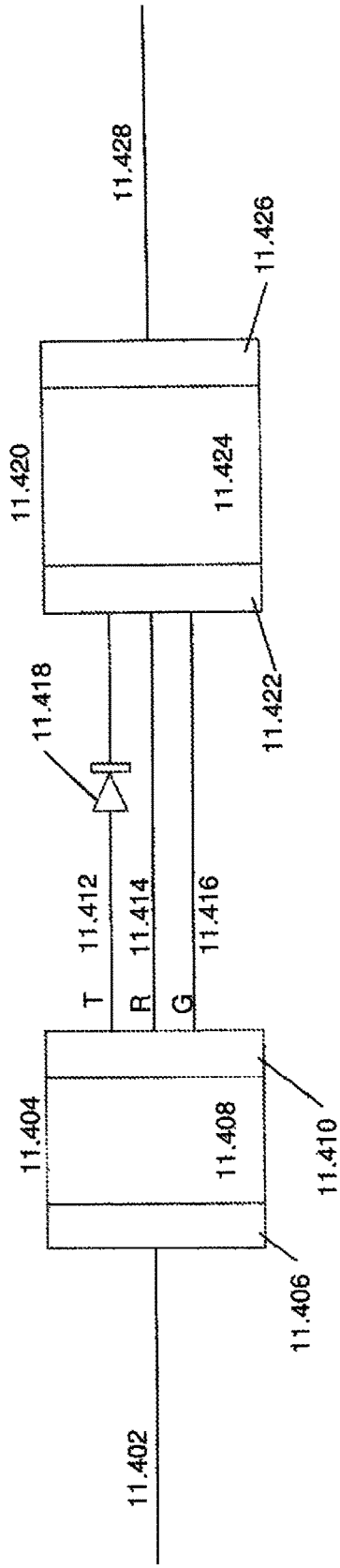
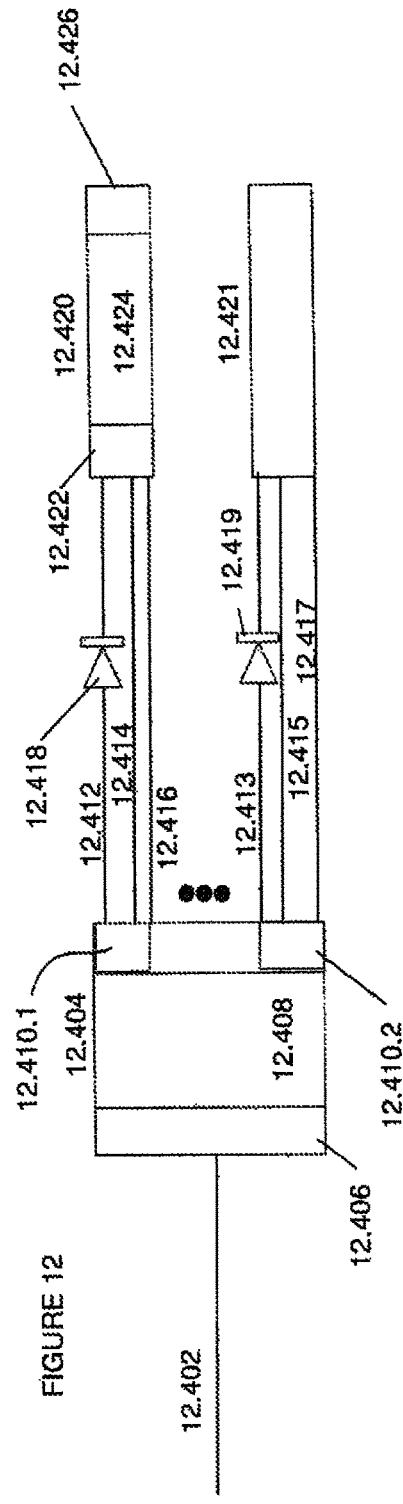
FIGURE 11
FIGURE 12

| IP ADDRESS OF RD 14.452 | HEADER 14.454 | DR PHONE NUMBER 14.456 | FORMAT TYPE 14.458 | EVENT MESSAGE 14.460 | TERMINATION 14.462 |

| IP ADDRESS OF MT 15.472 | HEADER 15.474 | ACK/NAK 15.476 |

CENTRAL STATION CONNECTIVITY

FIELD OF THE INVENTION

This invention relates to improvements in connectivity to central stations used to remotely monitor the activation of communication terminals such as personal emergency response, burglar and fire alarm systems when using new generation communications networks.

The invention will be described in terms of a system which enables the connection of a plurality of public switched telephone network (PSTN) devices via a digital communication network to selected central terminals.

In this specification:

"upstream" in relation to messages refers to the direction from remote device to message receiving centre, and, in relation to devices, refers to the side of the device facing the message receiving centre;

"downstream" in relation to messages refers to the direction from message receiving centre to remote device, and, in relation to devices, refers to the side of the device facing away from the message receiving centre;

"multiplexing" is used to refer to the process of directing messages having a plurality of origins and a common destination to a link to the common destination.

BACKGROUND OF THE INVENTION

Australian patent AU2003245113 (UHS Systems Pty Ltd) discloses a customer terminal adapted to be inserted between a burglar alarm system (panel) and a communication network. The customer terminal, on the side connected to the burglar alarm system, emulates the burglar alarm system communication protocol, such as a standard PSTN interface for the burglar alarm system, while sending and receiving messages on its network side in a format compatible with IP and cellular networks. This enables the burglar alarm system to communicate via the customer terminal with a communication network using a different communication protocol from that of the burglar alarm system. For example, such a customer terminal can be adapted to enable a burglar alarm system restricted to communicating via the PSTN to interface with a TCP/IP communication network.

Many burglar alarm systems currently in operation are designed to communicate via the public switched telephone network (PSTN) as shown in FIG. 1. The burglar alarm system (1.101) is connected to the incoming telephone line (1.103) which it uses to send alarm events via the PSTN (1.104) to a known dialer receiver (1.106), which is also connected to the PSTN via a telephone line (1.105). The telephone set (1.102) is generally connected in way that allows it to be disconnected in the event that the burglar alarm system (1.101) has an alarm to send via the PSTN (1.104).

The dialer receiver (1.106) is adapted to terminate the phone call from the burglar alarm system (1.101) and to receive and decode the message from the burglar alarm system (1.101), which is encoded in a known voice frequency format such as ContactID or SIA (Security Industry Association) format. On correctly decoding the message, the dialer receiver (1.106) returns a voice frequency encoded acknowledgement signal to the burglar alarm system (1.101) and sends the decoded alarm message to an automation system computer program (1.108) located at the central monitoring station, the automation system organising the display of the alarm messages to a human operator at the central station. The connection (1.107) between the dialer receiver (1.106) and the automation system (1.108) can be via a serial data connection, Ethernet and the like.

It can be seen from the above that the burglar alarm systems use a telecommunications network and a receiver to send alerts to be displayed on an automation system used by an operator.

With the widespread roll out of IP networks (FIG. 2), various burglar alarm system manufacturers have introduced IP mediation devices (2.020) which enable the transmission of alarm signals from a locally connected burglar alarm system (2.101) over IP networks (2.026) to IP enabled dialer receivers (2.030) where the destination IP address of the IP dialer receiver (2.030) can be programmed into the IP mediation devices (2.020).

These IP mediation devices (2.020) are either generic, converting the alarm signals from the PSTN interface (2.022) of a burglar alarm system (2.101) to IP (2.024) or proprietary format—supporting connectivity to burglar alarm system (2.101) from the specific manufacturer using an internal interface (2.022) which may be serial (e.g. RS.232 and the like) or various forms of keypad bus implementation, RS.485 or a proprietary interface. The burglar alarm system can be a third party system made by a different manufacturer from the manufacturer of the mediation device. Generally the manufacturer of the mediation device (2.020) is also the manufacturer of the IP enabled dialer receiver (2.030) located at the central station.

FIG. 3 shows that the mediation device (3.020) can also use a wireless connection, such as WiFi or cellular (3.024) to communicate alarm signals via the IP network (3.026) to the IP enabled dialer receiver unit (3.030) located at the central station.

The increasing popularity of cellular and broadband (IP) networks has resulted in more and more people cancelling their PSTN lines. This trend has driven the need to introduce PSTN replacement solutions for the delivery of alarm signals from customer premises to the various central stations. One such solution is shown in FIG. 4 where a range of burglar alarm systems (4.101) are communicating with a range of central station automation systems (4.108, 4.060) via customer terminal units (4.040, 4.042, 4.044). A management terminal 4.046 mediates between the remote devices and the automation systems at the central stations.

Each customer terminal unit (4.040, 4.042 and 4.044) connects to an associated burglar alarm system (eg, 4.101) via an interface (4.022) which may be one of: Dial Capture (FXS (Foreign Exchange Subscriber)), serial, RS.485 proprietary keypad bus or parallel inputs (PINs). Customer terminal units (4.040, 4.042 and 4.044) convert the alarm event signals sent by the burglar alarm systems (4.101) into a form compatible with wired (4.041) or wireless (4.404) IP networks. Customer terminal 4.044 is shown as being adapted for both wired and wireless communication providing path redundancy. The customer terminals address messages to the management terminal via the IP network. The signal traverses the IP network (4.026) to reach the management server (4.046), which can be connected to the IP network (4.026) via duplicated data links (4.048) to provide back-up. The management terminal (4.046), which may also be duplicated, can be a server which delivers the alarm signal to the destination central station automation system (4.108) via the IP network (4.026). In order to complete the delivery of the alarm event message to the automation system (4.108), the alarm event has to be delivered in a manner compatible with the automation system. In FIG. 4 this is achieved using agency terminal units (4.050, 4.052) that are adapted to convert the IP signal into an IP or serial form compatible with the automation system that connect to the IP network (4.026) via single (4.047) or redundant (4.049) data links. The agency terminal units (4.050, 4.052) convert the IP signal into an IP or serial form (4.054, 4.056 and 4.058) compatible with the automation system (4.108, 4.060). This method has the disadvantage of requiring the installation of one or more agency terminal units (4.050, 4.052) in every central station (4.000.1, 4.000.2, 4.000.3) which is connected to the IP Network (4.026) used for the alarm delivery network.

Another way of delivering the alarm event messages to the central station automation system is shown in FIG. 5. The network shown in FIG. 5 includes wired and wireless IP devices, 5.040, 5.042, 5.044, adapted for the delivery of alarm event signals from a plurality of burglar alarm systems and a PSTN redialer 5.062 used to convert the alarm event messages from a form compatible with IP networks to one capable of being delivered over the PSTN 5.104 to dialer receiver equipment 5.106 at a plurality of central stations, each equipped with an automation system 5.108. The redialer (5.062) is connected both to the PSTN 5.104 via a POTS line (5.064) and to the IP network (5.026) via data link (5.061). Alarm event messages received from the IP Network (5.026) are converted by the redialer (5.062) to a signal using the known voice frequency based signalling schemes such as ContactID and SIA which are transmitted via the PSTN (5.104) to a known dialer receiver (5.106) also connected to the PSTN via line (5.066). The dialer receiver (5.106) then delivers the alarm event message via a serial or IP interface (5.063) to the automation system (5.108) using a known protocol such as Ademco685. While this scheme is universal in nature, it suffers from a number of disadvantages, including: slowness of alarm delivery, inability to monitor the alarm delivery path and the need by the Central Station operators to retain their PSTN services which can be severed.

In a typical system there may be more than one redialer (5.062) which can be managed as a pool supporting the delivery of alarms over the PSTN (5.104) to multiple dialer receivers (5.106) at multiple central stations. The Management Terminal (5.046) selects the next available redialer (5.062) and sends it a message (FIG. 14) over the IP network (5.046) identifying the phone number of the destination dialer receiver (5.106) and the alarm message to be delivered.

The redialer (5.062) extracts the phone number of the destination dialer receiver (5.106) from the Management Terminal (5.046) message, which is either programmed into the Management Terminal (5.046) or obtained by the Customer Terminal (5.040) from the burglar alarm system (5.101) and attempts to send the event message as per the nominated Format to the destination Dialer Receiver (5.106). The redialer (5.062) responds to the Management Terminal (5.046) with an acknowledgement message (FIG. 15) containing the information in Table 1 allowing the Management Terminal (5.046) to determine whether the message was successfully delivered to its destination.

TABLE 1

Response sent by the redialer (5.062) to the Management Terminal (5.046)
NAK - Sent immediately on receiving a badly formed alarm packet
ACK - Sent immediately valid kissoff is received from the Dialer Receiver (5.108)
NAK - Sent immediately on no dialtone on the PSTN line (5.064)

TABLE 1-continued

NAK - Sent on no handshake or no answer timeout on the PSTN line (5.064)
NAK - Sent on no kissoff timeout on the PSTN line (5.064)

SUMMARY OF THE INVENTION

The invention provides means for directing upstream messages intended for one or more destinations from a plurality of remote terminals to a link to the common destination.

An embodiment of the invention can be adapted to perform data format conversion to convert upstream messages from a first format utilized at the remote terminal to a second format utilized at the common destination.

One embodiment the invention provides a first data switching means including a first data forwarding means (12.404) having a data link (12.402) adapted to receive upstream messages, and at least one upstream port (12.410.1), each upstream port having a specific port identity, wherein each upstream message includes address information identifying the first data forwarding means (12.404) and the or a selected one of the upstream port identities, the first data forwarding means (12.404) being adapted to forward upstream message to the selected upstream port, the selected upstream port being linked to corresponding message delivery means (12.420) adapted to deliver the upstream message to a destination address associated with the message delivery means.

The first data forwarding means can include two or more upstream ports (12.410.1, 12.410.2), and wherein the data switching means includes two or more message delivery means (12.420, 12.421), each upstream port (12.410.1, 12.410.2) being connected to a corresponding one of the message delivery means.

The data forwarding means can include first data format conversion means (11.406) adapted to convert the format of the upstream messages from a first format to an intermediate format for delivery to the upstream port to which the message was directed.

The data switching means can include second data format conversion means (11.410) adapted to convert the format of the upstream messages from the intermediate format to a second format for addressing by the message delivery means.

The first multiplexer can be a panel simulator.
The message delivery means can be a mediation device.
The first multiplexing means can be a redialer (19.062).
The message delivery means can be a cellular interface unit (19.502).

A further embodiment of the invention provides a method of multiplexing messages through data switching means having first data forwarding means and message delivery means, the data forwarding means having two or more upstream ports, the method including the steps of:—delivering upstream messages from a plurality of sources to the first data forwarding means, the upstream messages including the address of a specific upstream port of the first data forwarding means; forwarding the message to the message delivery means, adding a destination address to the messages and forwarding the message to the destination address.

The method can include the step of converting the format of the messages from a first format to an intermediate format to provide an intermediate message for delivery to the specific upstream port.

The method can include the steps of:—converting the format of the intermediate message from the intermediate format to a second format to form a second message, and forwarding the second message to the message delivery means for addressing to the destination address.

According to a further embodiment of the invention there is provided a communication system adapted to transmit messages between a plurality of remote devices (6.040, 6.045) and at least one central message receiving centre (6.108), the system including a management terminal (6.046) adapted to receive upstream messages including an upstream message identifier, and one or more first data switching means (6.070, 6.072), the first data switching means including data forwarding means (6.070) and data delivery means (6.072), the data forwarding means having one or more upstream ports, the management terminal being adapted to associate each upstream message with a corresponding upstream port of a selected one of the data forwarding means, the corresponding data forwarding means having an output link with an associated message delivery means.

The communication system can include first data switching means (6.026) between the management terminal and the first data switching means (6.070, 6.072).

The first data switching means can include a first data forwarding means (6.070) having a downstream data link (6.074), and at least one upstream port, and one or more message delivery means (6.072), each associated with one of said one or more upstream ports, each message delivery means being adapted to address messages to predetermined address.

The predetermined address can be associated with a network interface (6.030) associated with a predetermined central message receiving terminal (6.108).

The communication system can include further data switching means (6.080) between the data switching means and a central message receiving means.

The communication system can include first data format conversion means (11.408) adapted to convert upstream messages from the management terminal in a first format to an intermediate format to form an intermediate message, and second data format conversion means (11.424) adapted to convert intermediate messages to a second format to form a second message for addressing by the addressing means.

The management terminal (6.046) can receive upstream messages from a plurality of remote terminals (6.040, 6.045), each upstream message being associated with an upstream message identifier which identifies the remote terminal from which the upstream message was sent, and wherein the management terminal includes association means adapted to associate each remote terminal with a corresponding one the upstream ports of a corresponding data forwarding means.

The data forwarding means (11.404) can include a panel simulator and the delivery means (11.420) includes one or more mediation devices, and wherein each mediation device is adapted to communicate with a network interface (6.030) of a corresponding one of one or more message receiving centres (6.108).

The management terminal can be adapted to communicate with the remote terminals via a first IP network (6.026).

According to a further embodiment of the invention, there is provided a method of multiplexing upstream messages having a first format from each of a plurality of remote terminals for transmission to an associated one of one or more message receiving centres adapted to receive messages in a second format via one or more first data switching means, each data switching means including a data forwarding means having one or more upstream ports, each upstream port being connected to a corresponding message delivery means associated with a predetermined one of the said one or more message receiving terminals, the method including the steps of:—receiving each upstream message at the management terminal in the first format; identifying the corresponding upstream port of the corresponding data forwarding means with which the message is associated; forwarding the message to the corresponding upstream port associated with the corresponding message delivery means associated with the corresponding destination message receiving centre; and delivering the upstream message to a destination address associated with the corresponding destination message receiving centre.

The method of multiplexing can include the steps of:— converting the message in the first format to a message in an intermediate format to form an intermediate message for delivery to the upstream port; converting the intermediate message in the intermediate format to the second format to form a second message for delivering to a destination address; and forwarding the second message to the destination address.

The method of multiplexing, can include the steps of:— transmitting a downstream message in the second format from the message receiving centre to a selected remote terminal adapted to receive messages in the first format; receiving the downstream message at the associated message delivery means; converting the format of the downstream message from the second format to the intermediate format to form a downstream intermediate message; converting the downstream intermediate message to the first format to form a second downstream message, and forwarding the second downstream message to the selected remote terminal.

According to a further embodiment of the invention, data multiplexing means can include a first multiplexer having a data link adapted to receive upstream messages from a plurality of sources, and one or more upstream ports each upstream port having a specific port identity, wherein each upstream message includes address information identifying the multiplexer and a selected one of the upstream port identities, the multiplexer being adapted to direct upstream message to the selected upstream port, the selected upstream port being linked to message delivery means adapted to address the upstream message to a destination address associated with the message delivery means The data multiplexing means can include first data format conversion means adapted to convert the format of the upstream messages from a first format to an intermediate format for delivery to the upstream port to which the message was addressed.

The data multiplexing means can include second data format conversion means adapted to convert the format of the upstream messages from the intermediate format to a second format for addressing by the message delivery means.

According to a further embodiment of the invention, there is provided a method of multiplexing messages through data multiplexing means having a first multiplexer and message delivery means, the method including the steps of:—
  delivering upstream messages from a plurality of sources to the first multiplexer, the upstream messages including the address of a specific upstream port of the first multiplexer;
  adding a destination address to the messages from the specific upstream port.

The method can include the step of:—
converting the format of the messages from a first format to an intermediate format for delivery to the specific upstream port.

The method can include the step of:—
converting the format of the messages from the intermediate format to a second format for addressing to the destination address.

An embodiment of the present invention provides a means for multiplexing messages from a plurality of remote terminals to one or more message receiving terminals as described below in relation to FIG. 6. This arrangement allows the delivery of alarm event messages to central station automation systems using IP-enabled dialer receivers (6.030). This system can provide one or more functional advantages including: prompt alarm delivery, monitoring of the connection to the central station, the avoidance of new equipment at the Central Station and the elimination of PSTN lines.

According to an embodiment of the invention, alarm event signals generated by burglar and fire alarm panels which are delivered over IP or cellular networks from a customer terminal unit can be converted into a form compatible with third party IP mediation devices thereby allowing the delivery of the alarm event signals into existing third-party IP enabled dialer receiver equipment without the need for individual format conversion devices for each alarm panel.

In an embodiment of the invention, for each central station location and associated automation system connection, one or more dedicated mediation devices are used to provide the connection. A panel simulator which converts the alarm event signal compatible with the IP network into a form suitable for delivery to the IP enabled dialer receiver via said mediation devices, can be associated with each mediation device.

The invention also provides downstream communication over the reverse path.

BRIEF DESCRIPTION OF THE DRAWINGS

Embodiments of the invention will now be described, by way of example only, with reference to the accompanying drawings, in which:

FIG. 1 illustrates an existing alarm communication system utilizing the PSTN;

FIG. 2 illustrates an IP based alarm communication system which utilizes a third party mediation device to convert signals from a collocated burglar alarm system into a form compatible with IP networks for delivery into third party IP enabled dialer receiver equipment;

FIG. 7 is a schematic representation of the format of the messages used to deliver alarm events from the customer terminal to the management terminal;

FIG. 8 is a schematic representation of the acknowledgement message sent in reply from the management terminal to the customer terminal;

FIG. 10 is a schematic representation of the association register used by the management terminal to route the alarm event message to the panel simulator connected to the mediation device associated with the end central station providing the alarm monitoring service associated with the burglar or fire alarm system;

FIG. 11 shows detail of a first arrangement for connecting a panel simulator and mediation device;

FIG. 12 shows detail of the connection of a panel simulator to two or more mediation devices;

FIG. 14 shows the message format used between the management terminal and the redialer;

FIG. 15 shows the message format used between the redialer and the management terminal;

Figure 3:
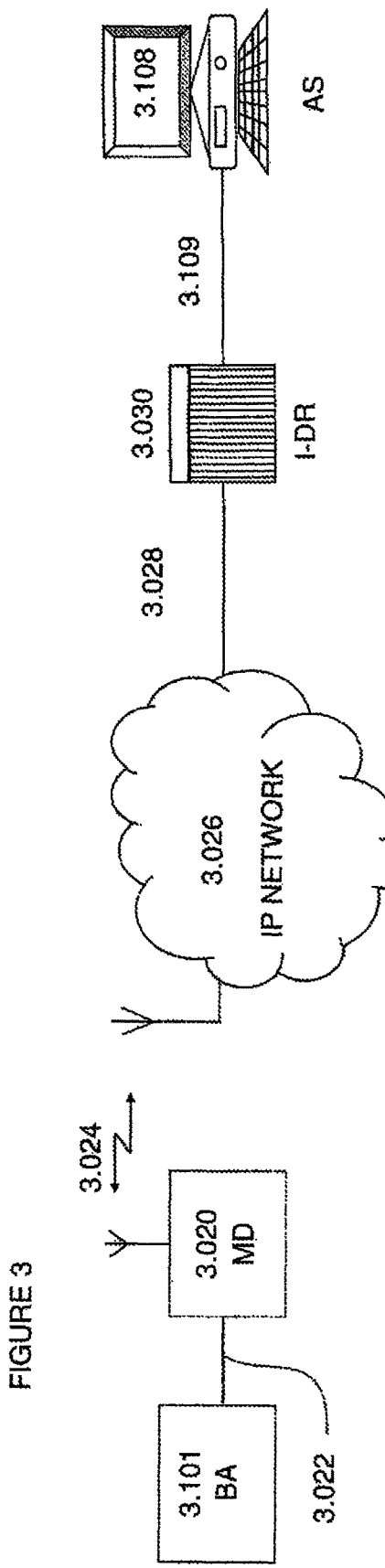
FIG. 3 illustrates a wireless IP based alarm communication system which utilizes a third party mediation device to convert signals from a burglar alarm system into a form compatible with IP networks for delivery into third party IP enabled dialer receiver equipment.

The drawings are intended to illustrate the inventive features of the embodiments illustrated and are not necessarily to scale.

In the drawings, the following designations are used:
$CT_n$: Customer Terminal 'n'
$BA_n$: Burglar Alarm System 'n'
IBA: IP enabled Burglar Alarm System
$AT_m$: Agency Terminal 'm'
$AS_p$: Automation System 'p'
$MT_t$: Management Terminal 't'
MD: Mediation Device
RD: PSTN Re-dialer
DR: Dialer Receiver
PS: Panel Simulator

DETAILED DESCRIPTION OF THE EMBODIMENT OR EMBODIMENTS

The invention will be described with reference to the embodiments illustrated in the accompanying drawings.

Figure 6:
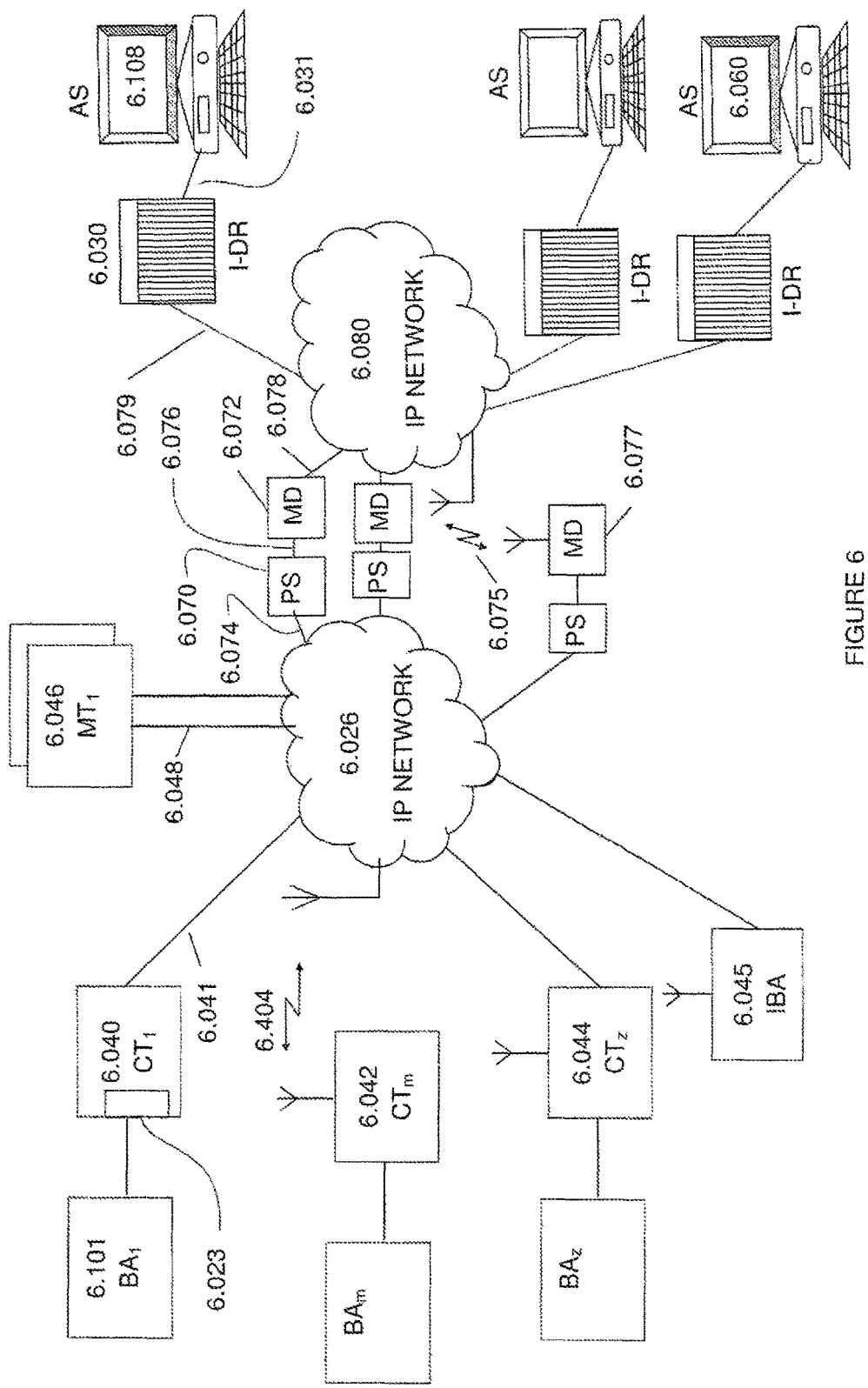
FIG. 6 is a schematic representation of an end to end alarm delivery network according to an embodiment of the invention.

FIG. 6 illustrates an embodiment of an alarm transmission network adapted for end-to-end communications to central monitoring stations.

As shown in FIG. 6, a plurality of customer terminals (6.040, 6.042, 6.044, 6.045) can be selectively connected to one of several central message receiving terminals or central monitoring stations, such as automation systems 6.108, 6.060. A management terminal (6.046) directs the upstream message to an appropriate panel simulator PS (6.070) associated with one of the central station automation system (6.108, 6.060) with which the customer terminal is registered via a selected one of panel simulators (6.070) adapted to decode an upstream message from a customer terminal and regenerate the message in a form compatible with the communication format of a mediation device (6.072) for onward transmission to a selected central station IP enabled dialer receiver (6.030) and through to the automation system monitoring terminal (6.108). The combination of the panel simulator (6.070) and mediation device MD (6.072) is used to multiplex and route the upstream traffic directed to a specific central message receiving terminal. Prior arrangements (FIG. 2, FIG. 3) utilized a mediation device for each remote terminal or burglar alarm system (6.101). The present arrangement permits the use of a single mediation device (6.072) for each central message receiving terminal (6.108). Locating the mediation device on the upstream side of the management terminal enables all the messages intended for a particular message receiving terminal to be directed through the mediation device dedicated to that central message receiving terminal. Physically, panel simulator (6.070) and the mediation device (6.072) can be co-located with the management terminal (6.046).

The burglar alarm system (6.101) is designed to deliver alarm event messages to one of the central monitoring stations such as 6.108, 6.060. These alarm events are generally transmitted by the burglar alarm system over a PSTN line as discussed above in relation to FIG. 1, or using an external communicator connected to the burglar alarm system via a serial interface or parallel input/output lines as discussed above. With reference to FIG. 6, a customer terminal (6.040) is generally equipped with an FXS (Foreign Exchange Subscriber) interface (6.023), also known as a dial-capture interface, which has selectable functionality to support a range of known analog formats such as ContactID and SIA allowing it to connect to the majority of burglar alarm systems which are equipped with a PSTN interface. The PSTN interface on a burglar alarm system is also known as a digital dialer. The customer terminal (6.040) can also be connected to various burglar alarm panels via a serial data interface, parallel inputs, Ethernet and RS.485, keypad bus interface or may be incorporated in the burglar alarm system (6.045).

The customer terminal (6.040) is interposed between the burglar alarm system (6.101) and the IP network (6.026) used to deliver the alarm event message to a management terminal (6.046). The customer terminal (6.040) is adapted to convert the message format used by the burglar alarm panel (6.101) to a format compatible with wired (6.041) or wireless (6.404) IP networks, including WiFi, cellular (2G, 3G, CDMA and 4G LTE). As shown in FIG. 6, some Customer Terminals (6.044) may support multiple network interfaces in order to increase network availability by providing communications path redundancy by using both wired and wireless networks for the delivery of the alarm event messages. Furthermore the customer terminal functionality can be integrated with the burglar alarm functionality in a single device as shown at 6.045.

The IP encoded message from the customer terminal (6.040 & 6.042) containing the alarm event message from the burglar alarm system (6.101), which may both be encrypted, is routed via the IP network (6.026) to the management terminal (6.046) connected to the IP network (6.026) via one or more IP connections (6.048). The management terminal may be duplicated for redundancy. The management terminal (6.046) uses an association register as shown in FIG. 10, to determine the message path to the destination central station.

Messages from the management terminal (6.046) to the automation system (6.108) are sent through a format converter which is adapted to convert the format of the message from that used by the management terminal (6.046) to one compatible with third-party IP dialer receivers (6.030). The destination IP address of the third-party IP dialer receiver (6.030) can be programmed into the format converter.

The format converter can be made up of a panel simulator (6.070) connected to a third-party mediation device (6.072).

The management terminal (6.046) then sends the IP encoded message via the IP network (6.026) to a panel simulator (6.070) allocated to facilitate communications with the nominated central station.

Figure 4:
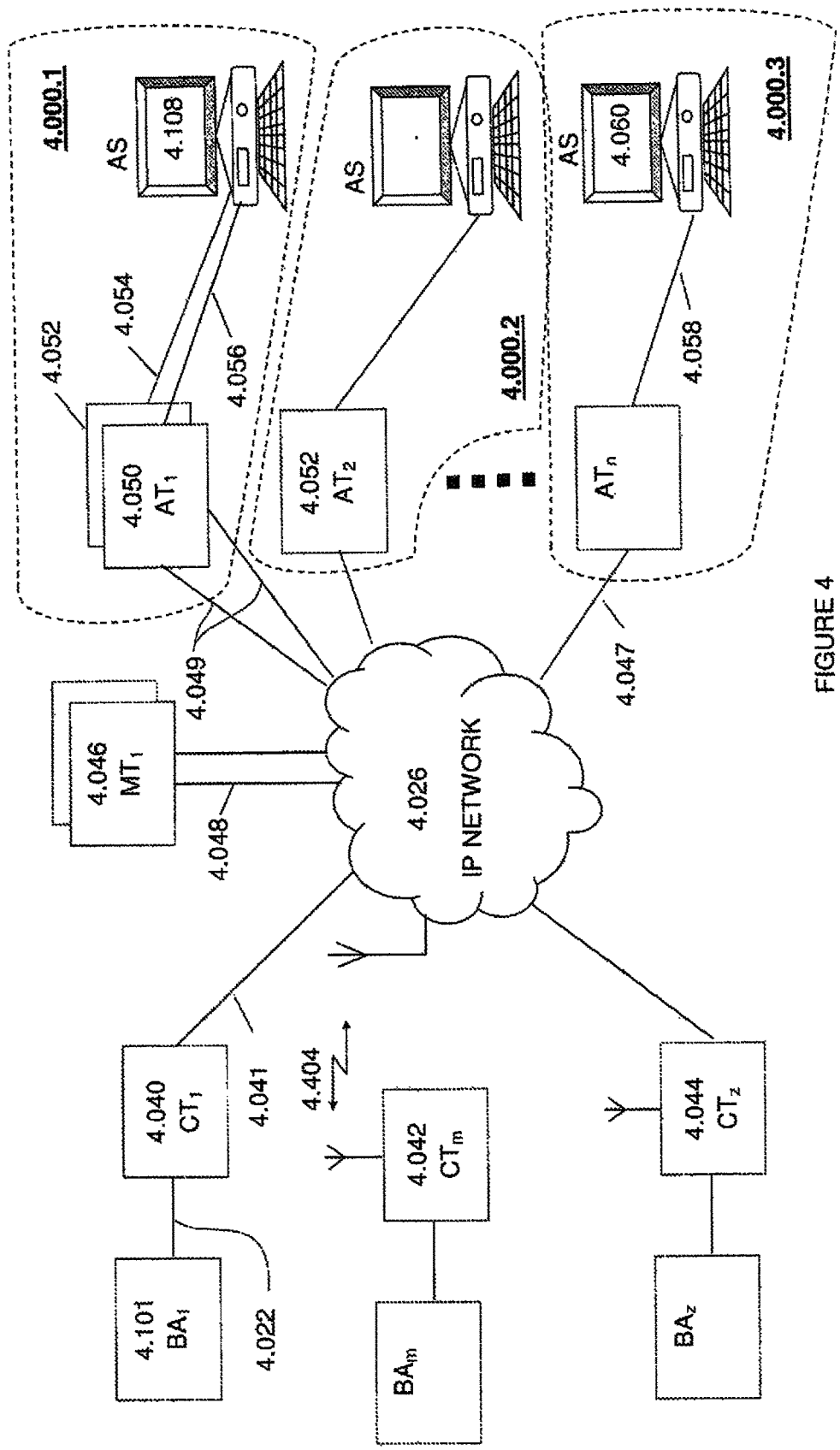
FIG. 4 illustrates a wired and wireless IP network adapted for the end to end delivery of alarm event signals over IP networks from a plurality of burglar alarm systems to a plurality of central stations, each equipped with an automation system.
Figure 5:
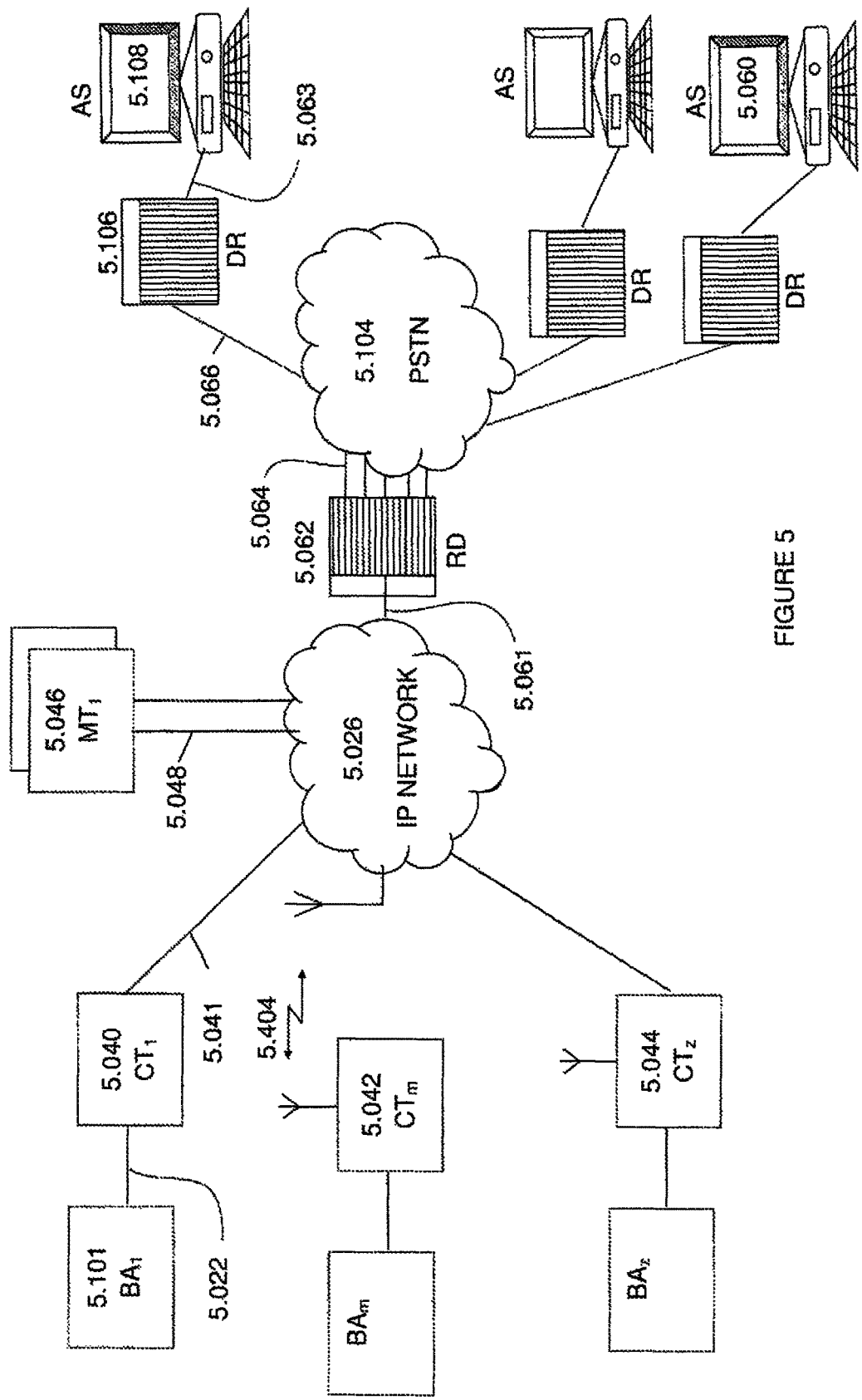
FIG. 5 illustrates an end to end alarm event delivery network adapted to deliver alarm events from a plurality of burglar alarm systems to a plurality of central stations.

In the conventional arrangement, as shown in FIG. 2, the mediation device (MD) 2.020 connects the burglar alarm panel (BA) 2.101 to the communications network 2.026. This arrangement is limited to a system architecture in which the burglar alarm is connected directly to the automation system without an intervening management system. In a second known arrangement shown in FIG. 4, the customer terminal (CT) connects the burglar alarm (BA) to the communications network 4.026. The customer terminal (CT) is adapted to transmit messages to the automation system utilizing a management terminal to establish the communications. The panel simulator (6.070) is provided by a conversion device designed to interface to a known third party mediation device such as MD (6.072) in a manner that emulates the burglar alarm panel to which the third party mediation device (6.072) is designed to be connected. Unlike the arrangement described in FIG. 2, in this embodiment of the invention, the mediation device is not interposed between a burglar alarm panel and a communications network. Instead, the mediation device (MD) is located between a panel simulator (PS) and a communication network to which alarm signals from a customer terminal are routed, and the mediation device communicates via a communication network with an alarm automation system with which the mediation device is associated. The panel simulator (6.070) is adapted to receive the IP encoded alarm event messages, which may be encrypted, as directed by the management terminal (6.046), via its IP network connection (6.074), such as Ethernet or wireless, decodes (and decrypts) the messages and regenerates the messages in a format compatible with the associated third party mediation device (6.072). The panel simulator electrical interface to the mediation device may include serial (e.g. RS.232 and the like) or various forms of keypad bus implementation, RS.485 or other proprietary interface or a digital dialer. The mediation device (6.072) delivers the received messages in IP format to the central station automation system (6.108), which may have an I-DR (6.030), via a second IP network (6.080), which may be the same as the first IP network (6.026).

The third party mediation device (6.072) is a unit generally supplied by burglar alarm system manufacturers to allow their or other burglar alarm panels to deliver alarms via IF networks to a proprietary IP enabled dialer receiver located at a central station. The third party mediation device (6.072) generally uses proprietary message protocols on its interface to the IP enabled dialer receiver. The messages to the IP enabled dialer receiver may also be encrypted. Some third party mediation devices (6.072) also use a proprietary interface to the burglar alarm system. The message from the third party mediation device (6.072) is terminated in a compatible IP enabled dialer receiver (6.030) which may be from the same third party manufacturer as the mediation device (6.072). The IP enabled dialer receiver (6.030) delivers the message to the central station automation system (6.108) over a known serial or IP connection (6.031).

The panel simulator (6.070) connection to the mediation device (6.072) shown as (6.076) may be RS.232 serial, proprietary serial, PSTN dialer, Ethernet, proprietary keypad bus, or RS.485. The proprietary serial interface may use 0 Volts to 12 Volt signalling levels compared with RS.232 that uses −12 Volts to +12 Volts signalling levels.

A unique feature of the present invention is that it uses a panel simulator (6.070) which converts the alarm event messages from the management terminal (6.046) into a form compatible with the mediation device (6.072) allowing a range of mediation devices (6.072) designed to deliver alarm event messages from a single, possibly proprietary, burglar alarm system collocated with the mediation device, to an associated IP enabled dialer receiver as shown in FIG. 2 and FIG. 3 to deliver alarm event messages from a plurality of burglar alarm systems (6.101) to a compatible IP enabled dialer receiver (6.030). This allows a single mediation device to interface to a plurality of burglar alarm systems via customer terminal equipment (6.040).

As a further modification of the system, the availability of the connection to the central station can be increased by using a mediation device such as 6.077 connected to the IF network (6.080) via a wireless interface (6.075), which may be, for example WiFi, cellular in its various forms including LTE, or even a second IP interface. This way the management terminal (6.046) will route the message to IP enabled dialer receiver (6.030) via a second mediation device (6.077) whenever the first mediation device (6.072) is unavailable.

By using different types of mediation devices (6.072), a range of IP enabled dialer receivers (6.030) can be supported thereby allowing the central station to use their existing dialer receivers to terminate the signalling from the IP network and minimizing or eliminating the need to deploy new specialized equipment at the central station to terminate the signalling from the IP network. In the case where the automation system is connected via a dialer receiver, the dialer receiver can be upgraded to support an IP interface whereby it becomes an IP enabled dialer receiver.

The system thus enables upstream messages directed to a single automation system from a plurality of remote devices to be multiplexed through a single data format conversion device, whereas the prior art such as discussed above in relation to FIG. 2 or FIG. 3 required a mediation device for each remote terminal.

More than one data format converter can be linked to a specific IP enabled dialer receiver and associated automation system to provide alternative routing of messages to the IP dialer receiver. The management terminal can be programmed to select between two or more data format converters based on network conditions such as congested pathways or equipment failure to improve traffic flows. For example, if one panel simulator is experiencing congestion, the management terminal can divert upstream traffic to a second panel simulator connected to a mediation device programmed with the required destination address. For downstream traffic, the automation system or IP dialer receiver can be programmed to recognize the address of the data format converter from which upstream traffic was received to enable the automation system to utilize the same data format converter for downstream traffic. As will be discussed further in relation to FIG. 12, while each mediation device is associated with a single automation system, a single panel simulator can be used in connection with two or more mediation devices.

Figure 18:
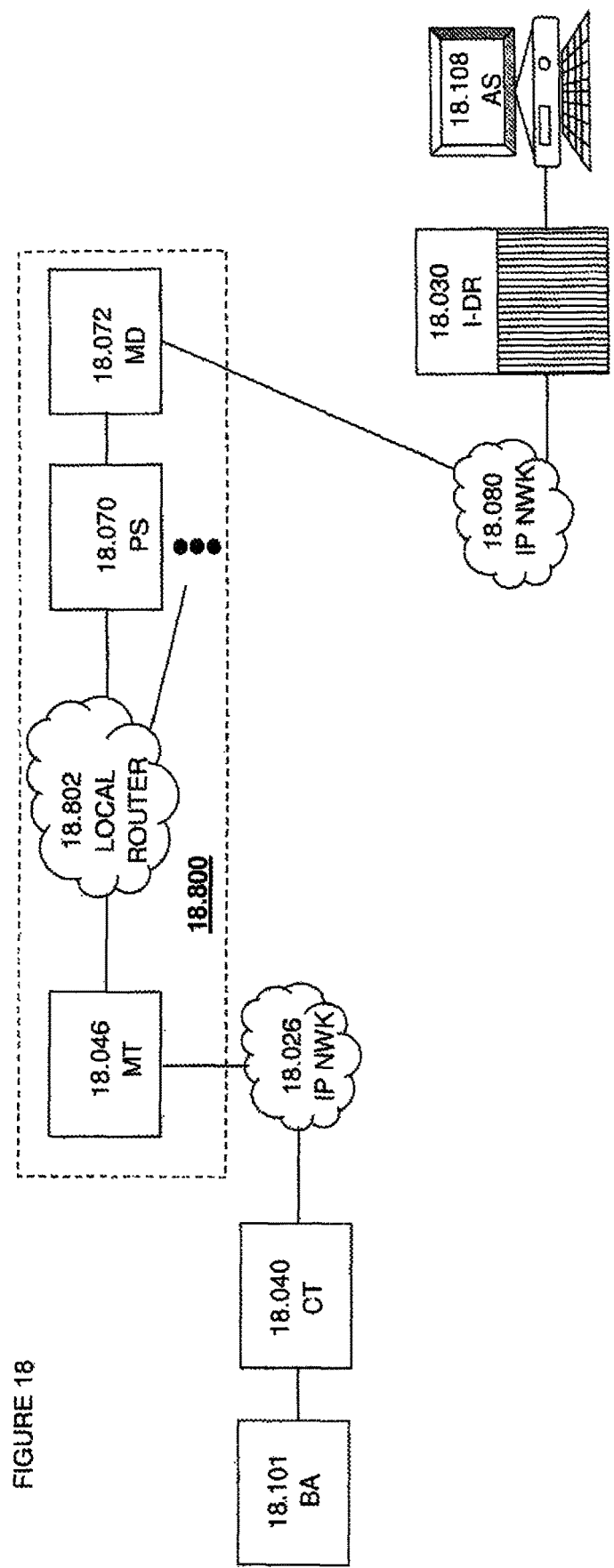
FIG. 18 illustrates a system according to a further embodiment of the invention in which the router means is co-located with the management terminal.

The embodiment of FIG. 18 includes a local router (18.802) which enables the panel simulators (18.070) and mediation devices (18.072) to be co-located with the management terminal (18.046) at a single site 18.800.

FIG. 7 illustrates the structure of the messages between the customer terminal and the management terminal. The message includes a TYPE field 7.080 to indicate the type of message, a LENGTH field 7.082 indicating the message length, a customer terminal identification field 7.084, a TIMESTAMP field 7.086, an INFORMATION field 7.088, which may be up to, for example, 100 bytes, and a CHECK DATA field 7.089. The Customer Terminal ID (7.084) field is used by the management terminal's association register shown in FIG. 10 to identify the destination central station using the association register of FIG. 10. The information field (7.088) may contain the alarm message using the known alarm message format such as ContactID or SIA. The message structure allows the message to be sent transparently from the customer terminal through the network to the panel simulator with which the alarm panel is associated. The SEQUENCE NUMBER field (7.083) may be used by the management terminal to track message flow.

As shown in FIG. 8, on receipt of a message from a customer terminal, the management terminal returns an acknowledgement message to the customer terminal which then sends an acknowledgement signal to the burglar alarm panel. The acknowledgement message to the customer terminal can include a TYPE field, 8.090, a LENGTH field 8.092, a SEQUENCE NUMBER field 8.094, and a CHECK DATA field 8.089.

Figure 9:
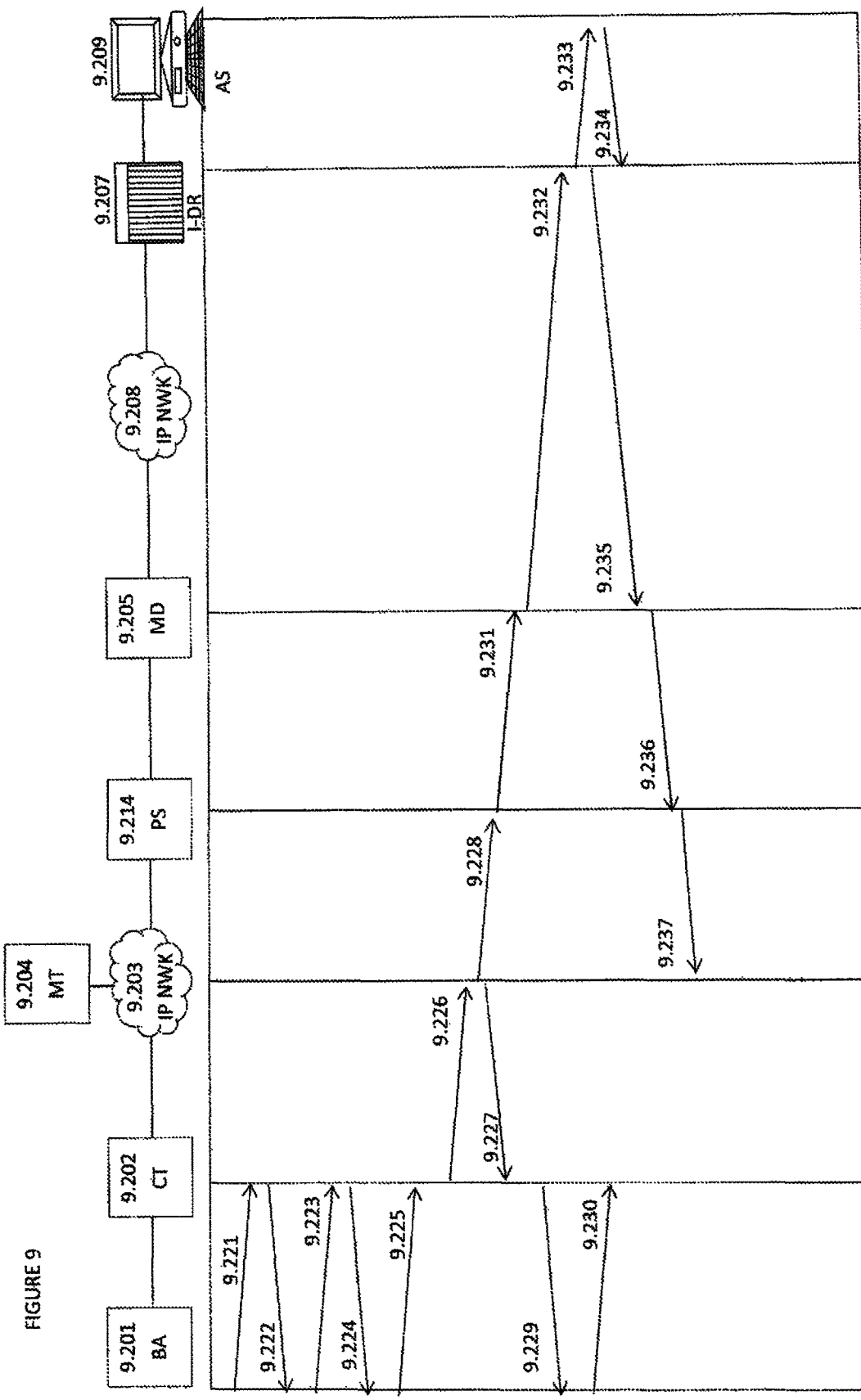
FIG. 9 illustrates one example of the message flew associated with an embodiment of the end to end alarm delivery network.

The information and message interchange between the various elements involved in the delivery of a message from the burglar alarm system (9.201) and the automation system (9.209) located at the associated central station is illustrated in FIG. 9 and detailed below. This example assumes that the connection between the burglar alarm system (9.201) and the customer terminal (9.202) uses dial capture with a known voice frequency signalling format such as ContactID. The interface between the panel simulator (9.214) and the mediation device (9.205) uses a proprietary serial interface able to carry the ContactID, SIA and the like decoded messages. As outlined above the embodiment can support other interface forms.

In FIG. 9, a simplified communication system is shown above a message transmission chart. The burglar alarm system 9.201 is connected to a customer terminal 9.202, which connects to an IP network 9.203. A management terminal 9204 is connected to the IP network. A panel simulator 9.214 is also connected to the IP network. A mediation device 9.205 connects to the panel simulator and an IP network 9.208 to which an IP enabled dialer receiver 9207 is connected through to an automation system 9.209. Each vertical line corresponds to a unit Or subsystem involved in the transaction other than the IP networks, the line under IP network 9.203 being associated with management terminal 9.204. The arrows indicate the direction of message transmission. Distance down the vertical line corresponds to event sequence and the passage of time, but is not to scale.

Figure 16:
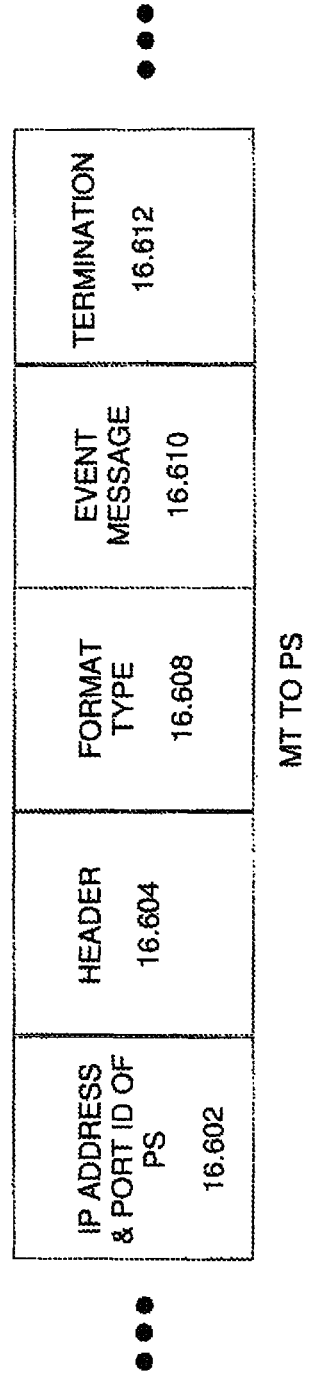
FIG. 16 shows the message format used between the management terminal and the panel simulator.
Figure 17:
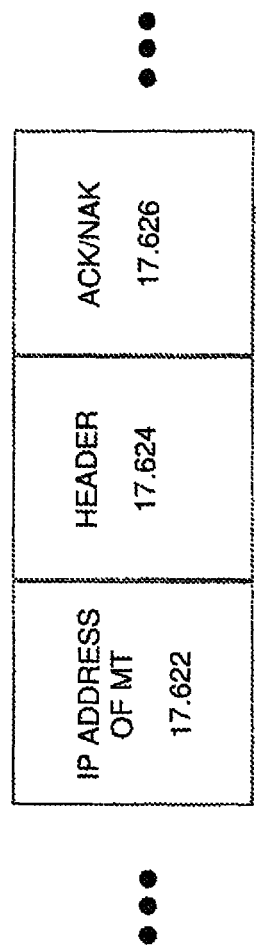
FIG. 17 shows the message format used between the panel simulator and the management terminal

The alarm event message delivery process starts with the burglar alarm system transitioning to the off-hook state (9.221). In response the customer terminal generates dial tone (9.222). The burglar alarm system dials a phone number (9.223), which does not need to be a valid PSTN phone number as the call is not carried over the PSTN. After a small delay the customer terminal generates a handshake signal (9.224) prompting the burglar alarm system to deliver the alarm event message (9.225). The customer terminal carries out checksum validation on the message from the burglar alarm system and forwards it via the first IP network (9.203) to the management terminal (9.204). After receiving the message, the management terminal (9.204) sends two messages (9.228) and (9.227). Message (9.227) is an acknowledgement message to the customer terminal, which in turn sends an acknowledgement signal to the burglar alarm system (9.229), which may proceed to transition to the onhook state (9.230) having completed sending its alarm event message. Message (9.228) is an alarm event message to the panel simulator (9.214) associated with the destination central station with the message format shown in FIG. 16 where the management terminal (9.204) sends the message using the known TCP/IP messaging protocol to the IP address of the panel simulator (9.214) dedicated to the destination IP enabled dialer receiver (9.207) located at the central station. The message shown in FIG. 16 includes the specific message format to use (16.608) and the event message (16.610). Message (9.228) triggers the panel simulator to send a reformatted message (9.231) to the mediation device (9.205) which then sends the message (9.232) using its proprietary protocol over the second IP network (9.208) to the IP enabled dialer receiver (9.207). On receiving the message, the IP enabled dialer receiver (9.207) sends out two messages (9.233) and (9.235). Acknowledgement message (9.235) is sent over the second IP network (9.208) to the mediation device (9.205) using the IP enabled dialer receiver's (9.207) proprietary protocol. The mediation device (9.205) returns an acknowledgement message (9.236) to the panel simulator (9.214) using its proprietary protocol over the local interface. The panel simulator (9214) transmits the acknowledgement message (9237) to the management terminal (9.204) using the format shown in FIG. 17. The ACK/NAK field (17.626) informs the management terminal (9.204) if the message delivery to the IP enabled dialer receiver's (9.207) has been successful. The alarm event message (9.233) is sent by the IP enabled dialer receiver (9.207) to the automation system (9209) over the local interface. The automation system sends acknowledgement message (9234) to the IF enabled dialer receiver (9.207).

FIG. 10 illustrates the association register used by the management terminal to identify the parameters associated with the message delivery path for a customer terminal with a given unique Customer Terminal ID (10.301). The access point address (10.302) identifies the network address, which may be an IP address, of the panel simulator(s) associated with the terminating IP enabled dialer receiver at the destination central station. The protocol field (10.303) identifies the type of mediation device that the panel simulator is connected to in case protocol conversion is required to be carried out by the management terminal. The priority field (10304) identifies the order in which the panel simulators are to be used. A priority of 1 indicates that this panel simulator should be used first, but when it is faulty or unavailable, the panel simulator with priority 2 should be used and so on.

FIG. 11 details the connection of a panel simulator 11.404 and a mediation device 11.420 in accordance with an embodiment of the invention. Link 11.402 connects the panel simulator 11.404 to the management terminal via an IP network, via a local area network (LAN) or a wide area network (WAN) such as the internet. The downstream side 11.406 of the panel simulator is adapted to receive and transmit signals in the IP format of link 11.402. Intermediate stage 11.408 performs bi-directional conversion between IP format and an intermediate format. The intermediate format can be a serial format suitable for input to the mediation device 11.420. The intermediate stage 11.408 of the panel simulator connects the intermediate message to the output port 11.410 of the panel simulator for transmission to the mediation device input 11.422.

The downstream side 11.422 of the mediation device may be adapted to receive and transmit the intermediate format signals, which may be, for example, serial or analog signals. The intermediate stage 11.424 of the mediation device converts the intermediate message to a format (eg. IP) suitable for reception by the IP enabled dialer receiver (e.g., 6.030) of the destination message reception centre 6.108. Stage 11.424 is adapted to perform bi-directional format conversion. The upstream side 11.426 of the mediation device is adapted to transmit and receive IP format signals to and from an IP enabled dialer receiver, such as 6.030 in FIG. 6, and the associated automation terminal 6.108.

The format of the upstream output of the panel simulator can be a serial output, such as RS.232, or a proprietary format. In FIG. 11, the output has a transmit line 11.412, a receive line 11.414, and may also include a ground line 11.416.

RS.232 format uses signal voltage of −12 v to +12 v. Some proprietary signals use 0 v to +12 v. Accordingly, a diode 12.418 can be inserted in the transmit line 11.412 of panel simulator 11.404 to convert the serial RS.232 to a form compatible with a proprietary mediation device 11.420 having a signal voltage of 0 v to +12 v.

FIG. 12 shows a similar arrangement to that of FIG. 11, adapted to enable the panel simulator 12.404 to communicate with two or more mediation devices 12.420, 12.421 via corresponding dedicated ports 12.410.1, 12.410.2. While only two ports 12.410.1, 12.410.2 are shown, more than two ports can be supported. Each port is connected to a corresponding data forwarding means such as 12.420. The upstream side of the panel simulator 12.404 has two or more sets of serial lines (12.412, 14.414, 12.416; 12.413, 12.415, 12.417). In this arrangement the management terminal (6.046) designates the IF port number which correlates with the appropriate set of serial lines to which the mediation device (12.420 or 12.421) associated with the destination dialer receiver is attached.

Figure 13:
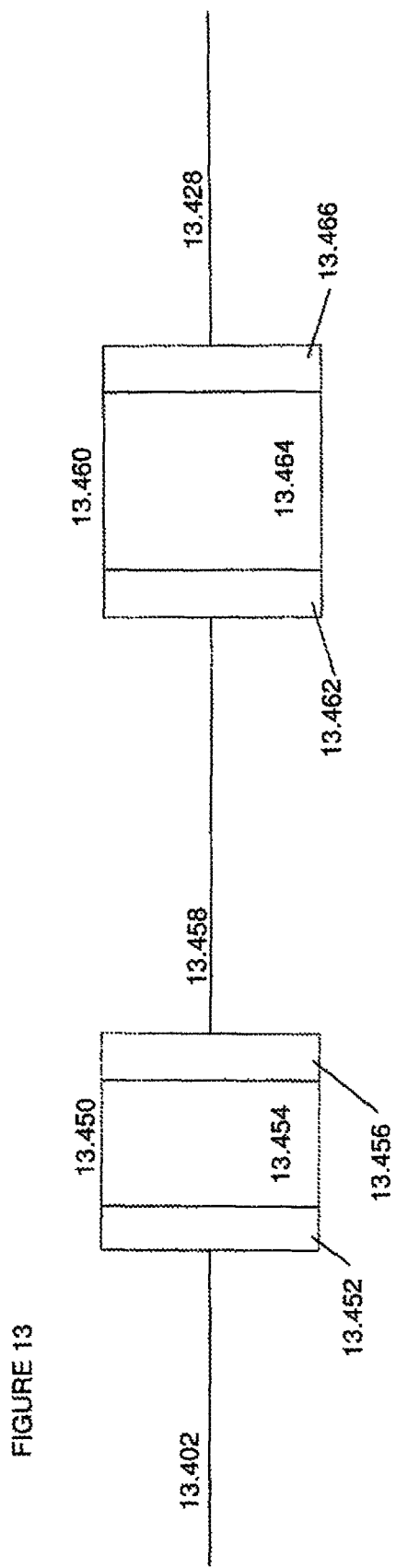
FIG. 13 shows an alternative arrangement to that of FIG. 12 using a digital dialer and FXS/IP converter.

FIG. 13 shows an alternative arrangement to that of FIG. 11, in which the panel simulator (13.450) functions as a redialer and mediation device (13.460) has an FXS interface 13.462 such that the mediation device serial interface is replaced by an FXS interface 13.462. The incoming IP format signals on line 13.402 are converted to dialer format and transmitted over line 13.458 to the dial capture side 13.462 of the FXS interface, where they are converted to IP for transmission to a destination IP dialer receiver and associated automation system over line 13.428.

The panel simulator (13.450) can be adapted to connect to more than one mediation device (13.060) in a manner similar to that shown in FIG. 12.

Figure 19:
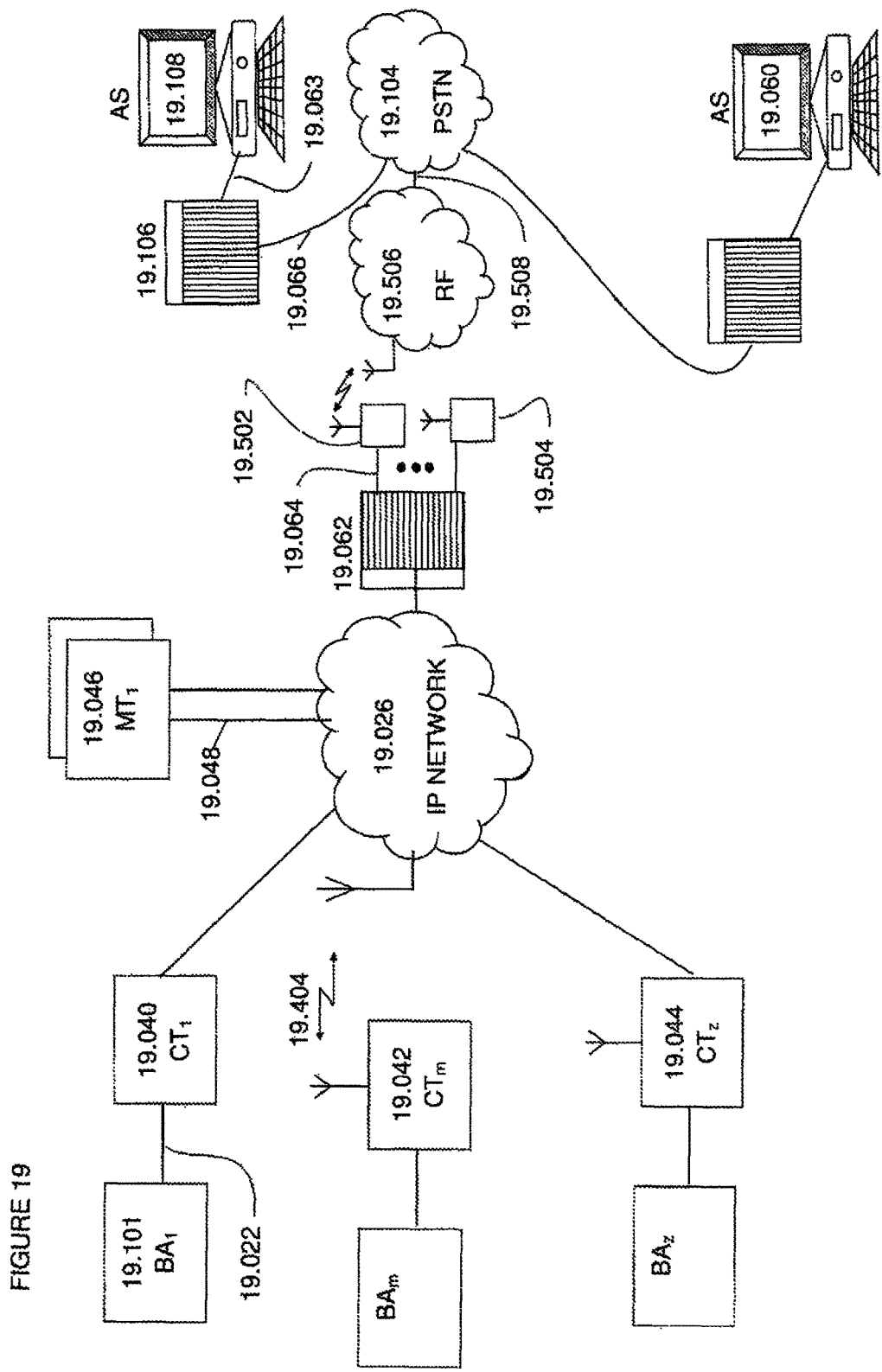
FIG. 19 details a further embodiment whereby the alarm delivery to the central station is via the cellular network using circuit-switched calls The numbering convention used in the drawings is that the digits in front of the full stop indicate the drawing number, and the digits after the full stop are the element reference numbers. Where practicable, the same element reference number is used in different drawings to indicate corresponding elements.

FIG. 19 details another embodiment of the invention whereby the alarm messages from burglar alarm systems (e.g. 19.101) are delivered to the automation system (e.g. 19.108 and 19.060) via a or a number of redialer units (19.062) which deliver alarm messages via one or more circuit-switched cellular networks (19.506) which connect to the PSTN (19.104). Each redialer's (19.062) PSTN interface (19.064) connects to a corresponding FXS interface on the cellular interface unit (19.502). The communications protocol between the redialer and the management terminal allows the redialer to inform the management terminal of the status of the redialer and its availability to place an outgoing call to the central station. In one embodiment the message delivery process is as follows: The event from the burglar alarm system (19.101) including the PSTN phone number of the dialer receiver (19.106) is sent by the customer terminal (19.040) over a wired and/or wireless connection to IP network (19.206) and then to the management terminal (19.046). The management terminal (19.046) forwards the alarm message and the phone number of the dialer receiver (19.106) over the IP network (19.026) to the next available redialer (19.062).

The redialer (19.062) goes off-hook and receives dial tone from the cellular interface unit (19.502)

The redialer (19.062) dials the phone number of the dialer receiver (19.106) which is re-dialed by the cellular interface unit (19.502) which establishes a circuit-switched call to the dialer receiver (19.106) via the cellular network (19.506) and the PSTN (19.104) to deliver the alarm message.

After receiving the message, dialer receiver (19.106) delivers it to the automation system (19.108) as described elsewhere in this document.

In an alternative embodiment, the phone number of the dialer receiver (19.106) may be supplied by the management terminal for example using a look-up table populated during the activation of the service.

The redialers and the cellular interface units may be collocated with the management terminal and connected via a local area network.

For the sake of clarity the embodiment above is detailed using separate redialer and cellular interface units. In an alternative embodiment the redialer and cellular interface units form a single integrated unit which provide the advantages of reducing call setup times and maintaining the connection as a digital data stream avoiding the conversion to and from the analog domain.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

In this specification, reference to a document, disclosure, or other publication or use is not an admission that the document, disclosure, publication or use forms part of the common general knowledge of the skilled worker in the field of this invention at the priority date of this specification, unless otherwise stated.

In this specification, terms indicating orientation or direction, such as "up"', "down", "vertical", "horizontal", "left", "right" "upright", "transverse" etc. are not intended to be absolute terms unless the context requires or indicates otherwise.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. An inter-network or intra-network data switching means adapted to switch dedicated messages within or between communications networks, the data switching means including:
    a first data forwarding means having:
    a data link adapted to receive upstream messages, and
    at least one upstream port,
    each upstream port having a specific port identity, wherein
    each upstream message includes address information identifying:
    the first data forwarding means and
    a selected upstream port of the at least one upstream port,
    the first data forwarding means being adapted to forward an upstream message to the selected upstream port,
    the data switching means including at least one message delivery means adapted to deliver the upstream message to a destination address stored in the message delivery means,
    each port of the data forwarding means being associated with a corresponding one of the message delivery means to enable forwarding of the upstream message to a destination address stored in the message delivery means;
    wherein the first data forwarding means includes two or more upstream ports, and wherein the data switching means includes two or more message delivery means, each upstream port being connected to a single message delivery means to define a one-to-one correspondence between each upstream port and each message delivery means.

2. Data switching means as claimed in claim 1, wherein the first data forwarding means includes first data format conversion means adapted to convert the format of the upstream messages from a first format to an intermediate format for delivery to the upstream port to which the message was directed.

3. Data switching means as claimed in claim 2, including second data format conversion means adapted to convert the format of the upstream messages from the intermediate format to a second format for addressing by the message delivery means.

4. Data switching means as claimed in claim 1, wherein the first data forwarding means is a panel simulator.

5. Data switching means as claimed in claim 1, wherein the message delivery means is a mediation device.

6. Data switching means as claimed in claim 1, wherein the first data forwarding means is a redialer.

7. Data switching means as claimed in claim 1, wherein the message delivery means includes a cellular interface unit.

8. A method of multiplexing messages through inter-network or intra-network data switching means having first data forwarding means and at least one message delivery means, the method including:
    receiving upstream messages from a plurality of sources at the first data forwarding means, the upstream messages including the address of a specific upstream port of the first data forwarding means, first data forwarding means having two or more upstream ports, each upstream port being associated with a corresponding one of the message delivery means, each upstream port being connected to a single message delivery means to define a one-to-one correspondence between each upstream port and each message delivery means, each message delivery means including a destination address;

forwarding the message to the message delivery means, adding a destination address to the messages at the message delivery means, the destination address stored in the message delivery means, and forwarding the message to the destination address.

9. A method as claimed in claim 8, including:
converting the format of the messages from a first format to an intermediate format to provide an intermediate message for delivery to the specific upstream port.

10. A method as claimed in claim 9, including:
converting the format of the intermediate message from the intermediate format to a second format to form a second message, and
forwarding the second message to the message delivery means for addressing to the destination address.

11. A communication system adapted to transmit messages between a plurality of remote devices and at least one central message receiving centre, the system including a management terminal adapted to receive upstream messages including an upstream message identifier, and one or more inter-network or intra-network data switching means, the data switching means including data forwarding means and data delivery means, the data forwarding means having one or more upstream ports, the management terminal being adapted to associate each upstream message with a corresponding upstream port of a selected one of the data forwarding means, and the corresponding data forwarding means having an output link with an associated message delivery means, each upstream port being connected to a single message delivery means to define a one-to-one correspondence between each upstream port and each message delivery means.

12. A communication system as claimed in claim 11, including second data switching means between the management terminal and the first data switching means.

13. A communication system as claimed in claim 11, wherein the first data switching means includes a first data forwarding means having a downstream data link, and at least one upstream port, and one or more message delivery means, each associated with one of said one or more upstream ports, each message delivery means being adapted to address messages to a predetermined address.

14. A communication system as claimed in claim 13, wherein the predetermined address is associated with a network interface associated with a predetermined central message receiving terminal.

15. A communication system as claimed in claim 11, including second data switching means between the data switching means and a central message receiving means.

16. A communication system as claimed in claim 11, including first data format conversion means adapted to convert upstream messages from the management terminal in a first format to an intermediate format to form an intermediate message, and second data format conversion means adapted to convert intermediate messages to a second format to form a second message for addressing by the addressing means.

17. A communication system as claimed in claim 11, wherein the management terminal receives upstream messages from a plurality of remote terminals, each upstream message being associated with an upstream message identifier which identifies the remote terminal from which the upstream message was sent, and wherein the management terminal includes association means adapted to associate each remote terminal with a corresponding one of the upstream ports of a corresponding data forwarding means.

18. A communication system as claimed in claim 11, wherein the data forwarding means includes a panel simulator and the delivery means includes one or more mediation devices, and wherein each mediation device is adapted to communicate with a network interface of a corresponding one of one or more message receiving centres.

19. A communication system as claimed in claim 11, wherein the management terminal is adapted to communicate with the remote terminals via a first IP network.

20. A method of multiplexing upstream messages having a first format from each of a plurality of remote terminals for transmission to an associated one of one or more message receiving centres adapted to receive messages in a second format via one or more inter-network or intra-network data switching means, each data switching means including a data forwarding means having one or more upstream ports, the method including:
receiving each upstream message at the management terminal in the first format;
identifying the corresponding upstream port of the corresponding data forwarding means with which the message is associated, each upstream port being connected to a corresponding message delivery means associated with a predetermined one of the said one or more message receiving centres, each upstream port being connected to a single message delivery means to define a one-to-one correspondence between each upstream port and each message delivery means;
forwarding the message to the corresponding upstream port associated with the corresponding message delivery means associated with the corresponding destination message receiving centre, the corresponding message delivery means storing a destination address associated with the corresponding destination message receiving centre; and
delivering the upstream message to the destination address associated with the corresponding destination message receiving centre.

21. A method of multiplexing as claimed in claim 20, including:
converting the message in the first format to a message in an intermediate format to form an intermediate message for delivery to the upstream port;
converting the intermediate message in the intermediate format to the second format to form a second message for delivering to a destination address; and
forwarding the second message to the destination address.

22. A method as claimed in claim 20, including:
transmitting a downstream message in the second format from the message receiving centre to a selected remote terminal adapted to receive messages in the first format;
receiving the downstream message at the associated message delivery means;
converting the format of the downstream message from the second format to the intermediate format to form a downstream intermediate message;
converting the downstream intermediate message to the first format to form a second downstream message, and forwarding the second downstream message to the selected remote terminal.

23. Data multiplexing means including an inter-network or intra-network multiplexer having a data link adapted to receive upstream messages from a plurality of sources, and one or more upstream ports, each upstream port having a specific port identity, wherein each upstream message includes address information identifying the multiplexer and a selected one of the upstream port identities, the multiplexer being adapted to direct an upstream message to the selected upstream port, the selected upstream port being linked to message delivery means adapted to address the upstream message to a destination address associated with the message delivery means, each upstream port being connected to a single message delivery means to define a one-to-one correspondence between each upstream port and each message delivery means.

24. A method of multiplexing messages through inter-network or intra network data multiplexing means, the method including:
  delivering upstream messages from a plurality of sources to a first multiplexer, the upstream messages including the address of a specific upstream port of the first multiplexer, the first multiplexer including one or more ports and one or more associated message delivery means corresponding to one of the ports, each upstream port being connected to a single message delivery means to define a one-to-one correspondence between each upstream port and each message delivery means;
  and at the associated message delivery means, adding a destination address to the messages from the specific upstream port, the destination address stored in the associated message delivery means.

\* \* \* \* \*